United States Patent
Kuwahara (12)

(10) Patent No.: US 6,273,164 B1
(45) Date of Patent: Aug. 14, 2001

(54) MOTORCYCLE TIRE WITH DIFFERENT MODULUS CARCASS LAYERS

(75) Inventor: Takao Kuwahara, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/345,379

(22) Filed: Jun. 30, 1999

(30) Foreign Application Priority Data

Jul. 2, 1998 (JP) .................................................. 10-187661

(51) Int. Cl.[7] ................. B60C 9/04; B60C 9/06; B60C 15/00
(52) U.S. Cl. .................. 152/550; 152/552; 152/554; 152/557; 152/559
(58) Field of Search ..................... 152/557, 550, 152/552, 554, 559

(56) References Cited

U.S. PATENT DOCUMENTS 3,980,119 * 9/1976 Nakasaki ........................ 152/557 X
4,770,222 * 9/1988 Mezzanotte ..................... 152/557 X

* cited by examiner

Primary Examiner—Adrienne C. Johnstone
(74) Attorney, Agent, or Firm—Birch, Stewart, Kolasch & Birch, LLP

(57) ABSTRACT

A motorcycle tire comprises a carcass composed of a low-modulus layer disposed along the inside of the tire and a high-modulus layer disposed outside thereof, the high-modulus layer comprising a high-modulus ply, and the low-modulus layer comprising a low-modulus ply. Preferably, the cords of each ply are inclined at a bias angle of from 20 to 50 degrees with respect to the tire equator so that the carcass has a bias structure. The low-modulus layer is composed of two low-modulus plies of low-modulus cords extending between bead portions through a tread portion and sidewall portions and turned up around a bead core disposed in each bead portion. The high-modulus layer is composed of a single high-modulus ply of high-modulus cords extending between the sidewall portions through the tread portion and terminated at a position radially outward of the bead cores but radially inward of the maximum width position of the carcass.

6 Claims, 1 Drawing Sheet

MOTORCYCLE TIRE WITH DIFFERENT MODULUS CARCASS LAYERS

FIELD OF THE INVENTION

The present invention relates to a pneumatic tire for motorcycles, more particularly to an improved carcass structure capable of improving tire rigidity during cornering and ride comfort during straight running.

As the motorcycles bank during cornering, it is important that motorcycle tires can display a proper rigidity during cornering to keep a stable bank angle. If the carcass rigidity is increased in order to obtain the necessary tire rigidity, shock absorption and ride comfort during straight running become worse and further the tire weight increases. If the carcass rigidity is decreased in order to improve the shock absorbing performance, cornering becomes unstable. Thus, the rigidity during cornering and shock absorption or ride comfort during straight running are antinomy.

It is therefore an object of the present invention to provide a motorcycle tire in which both the rigidity during cornering and ride comfort during straight running can be improved.

BRIEF SUMMARY OF THE INVENTION

According to the present invention, a motorcycle tire comprises a carcass composed of a low-modulus layer disposed along the inside of the tire and a high-modulus layer disposed outside thereof, the high-modulus layer comprises at least one high-modulus ply of cords, and the low-modulus layer comprises at least one low-modulus ply of cords.

Preferably, the cords of each ply are inclined at a bias angle of from 20 to 50 degrees with respect to the tire equator so that the carcass has a bias structure.

The low-modulus layer is composed of two low-modulus plies of low-modulus cords extending between bead portions through a tread portion and sidewall portions and turned up around a bead core disposed in each bead portion.

The high-modulus layer is composed of a single high-modulus ply of high-modulus cords extending between the sidewall portions through the tread portion and terminated at a position radially outward of the bead cores but radially inward of the maximum width position of the carcass.

In this specification, the high-modulus ply or low-modulus ply means that the ply as a complex of the cords and topping rubber has a relatively high or low ply modulus. In practice, however, the ply modulus can be defined as the total of the moduli (initial modulus) of the cords embedded in a unit width (e.g. 5 cm) of the ply as the modulus of rubber is considerably small. Therefore, when the embedded cords are the same modulus, the ply modulus is defined as the product of the modulus of a cord and the cord count per unit width.

It is therefore an object of the present invention to provide a motorcycle tire in which both the rigidity during cornering and the ride comfort during the straight running can be improved.

An embodiment of the present invention will now be described in detail in conjunction with the accompanying drawing.

DETAILED DESCRIPTION OF THE INVENTION

Figure 1:
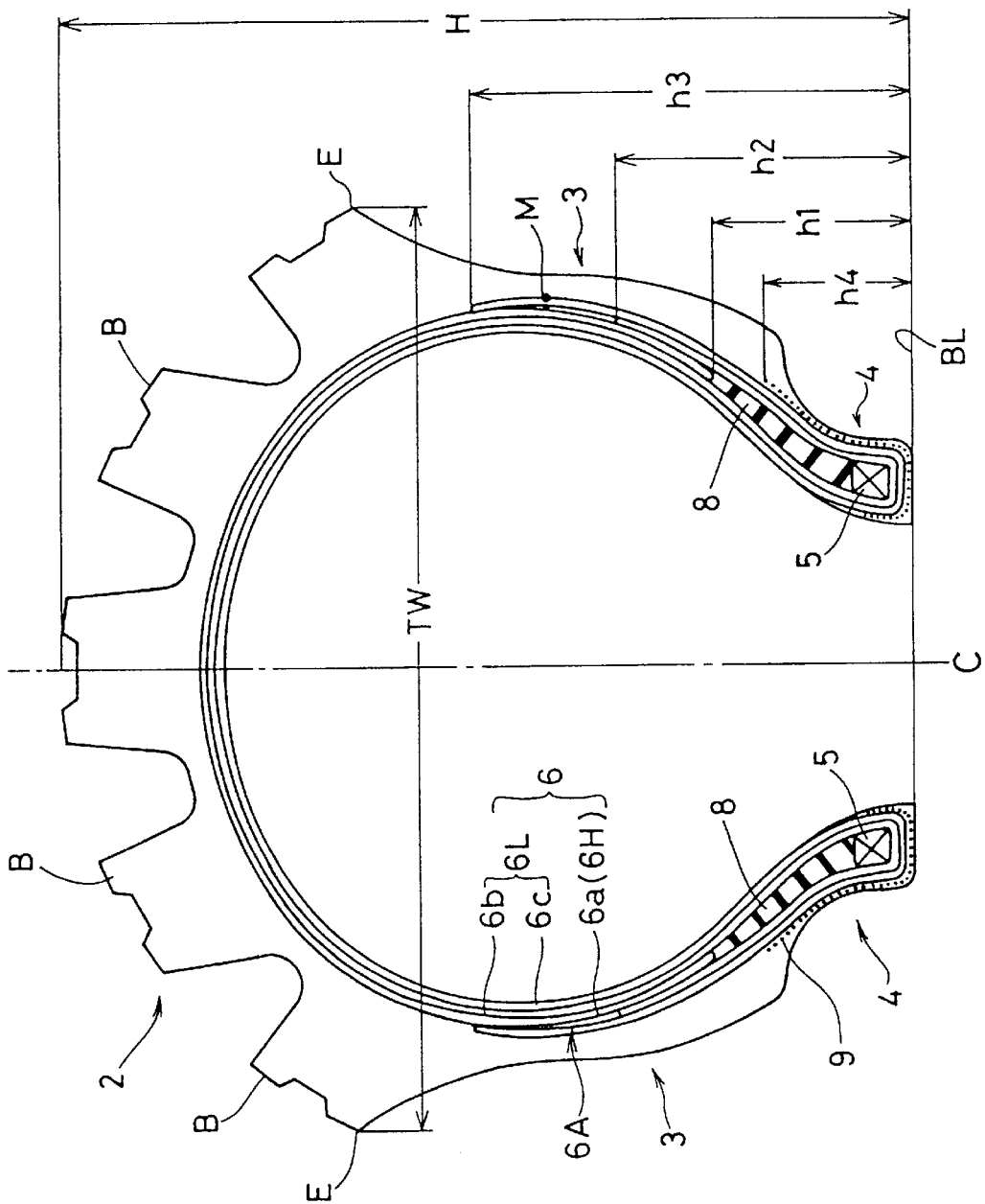
FIG. 1 is a cross sectional view of an embodiment of the present invention.

Motorcycle tire according to the present invention comprises a tread portion 2, a pair of sidewall portions 3, a pair of bead portions 4 with a bead core 5 therein, and a carcass 6 extending between the bead portions 4.

In the tread portion 2, a belt or breaker as a tread reinforcing layer is not disposed. The tread is curved by a relatively small radius of curvature so that the maximum tire width TW lies between the tread edges E.

In this embodiment, the tire is adapted for off-road use, and the tread portion 2 is provided with a block pattern made up of a plurality of blocks B each having a dent to improve road grip.

Each of the bead portions 4 is provided with a bead apex 8 made of hard rubber extending radially outwards from the bead core 5. The Shore A hardness thereof is in a range of 65 to 95 for example.

The above-mentioned carcass 6 is composed of a low-modulus layer 6L disposed along the inside of the tire and a high-modulus layer 6H disposed on the outside of the low-modulus layer 6L. The high-modulus layer 6H comprises a high-modulus ply 6a, and the low-modulus layer 6L comprises two low-modulus plies 6b and 6c. Each of the plies 6a, 6b and 6c is made of rubberized cords arranged at a bias angle in the range of from 20 to 50 degrees (in this example 28 to 35 degrees) with respect to the tire equator C. In a relationship between the adjacent plies, the cords in one ply cross the cords in the other ply. Accordingly, the carcass 6 has a bias structure. Therefore, the tread portion 2 can display a good enveloping effect, and ride comfort and off-road grip can be improved.

Each of the low-modulus plies 6b and 6c extends between the bead portions 4 through the tread portion 2 and sidewall portions 3 and turned up around the bead core 5 from the inside to the outside of the tire to be secured thereto.

For the low-modulus cords or the cords of the low-modulus plies, those having an initial modulus of less than 6000 N/sq.mm are preferably used. In this example, nylon cords (2/940 dtex, 2/1400 dtex) having an initial modulus of about 5500 to 5900 N/sq.mm are used.

The height h2 of the turnup portion of the low-modulus outer ply 6b is in the range of from 0.3 to 0.4 times the tire section height H. The height h3 of the turnup portion of the low-modulus inner ply 6c is in the range of from 0.45 to 0.6 times the tire section height H. The heights are measured from the bead base line BL.

The above-mentioned high-modulus ply 6a extends between the sidewall portions 3 through the tread portion 2. The ends thereof are positioned radially outward of the bead cores 5 but radially inward of the maximum width position M of the carcass 6. Thus, this ply 6a is not turned up in the bead portions 4. The high-modulus ply 6a is made of high-modulus cords having a modulus higher than the above-mentioned low-modulus cords. For the high-modulus cords, organic fiber cords having an initial modulus of not less than 7000 N/sq.mm, preferably not less than 7500 N/sq.mm are used. In this example, polyester cords (2/1670 dtex) having an initial modulus of about 7500 to 7600 N/sq.mm and aramid cords (2/1670 dtex) having an initial modulus of about 8500 to 8700 N/sq.mm are used. Also, a hybrid cord of two or more materials can be used.

Therefore, the sidewall portions 3 are reinforced and the lateral stiffness providing rigidity during cornering is increased. If the high-modulus layer 6H does not exist around the maximum width position M, the rigidity becomes insufficient. If the high-modulus layer 6H reaches to the bead cores, when the tire is mounted on a wheel rim, the radially inner ends are firmly secured to the bead cores by a large compressive force from the rim flanges. Thus, it functions like a turned-up ply, and the ride comfort greatly deteriorates.

The radially inner ends of the high-modulus ply 6a is disposed on the axially inside of the turnup portion 6A of the low-modulus ply so that the ends are covered by the low-modulus ply.

In this embodiment, further, the above-mentioned bead apexes 8 are extended to the ends of the high-modulus ply 6a. Furthermore, each of the bead portions 4 is provided with a bead reinforcing layer 9 extending along the axially inner surface and outer surface of the bead portion 4 to increase the bead rigidity. In this example, the bead reinforcing layer 9 is composed of one ply of organic fiber cords, e.g. nylon, polyester, rayon, aromatic polyamide and the like embedded in rubber in parallel formation. Preferably, the height h4 of the axially outer part of the bead reinforcing layer 9 measured from the bead base line BL to the radially outer end thereof is set in the range of from 0.1 to 0.25 times the tire section height H.

As a result, the rigidity is gradually decreased from the bead core 5 to the neighborhood of the tread edge E. And it becomes possible to show a suitable rigidity according to the camber angle during cornering. Further, ply separation failures can be prevented.

The modulus of ply is defined as the total modulus of the cords plus the modulus of topping rubber per a unit width of the ply. In this embodiment, as the high-modulus ply is made of high-modulus cords and the low-modulus ply is made of low-modulus cords, the high-modulus ply is higher in modulus than the low-modulus ply. However, it is possible that the high-modulus ply 6a is made of cords identical with those of the low-modulus ply 6b, 6c. In this case, however, in order to increase the ply modulus, the cord count or density of the high-modulus ply 6a must be higher than each of the low-modulus plies 6b and 6c.

When the low-modulus layer 6L and/or the high-modulus layer 6H are composed of a plurality of plies, the modulus of ply can be changed from one another in each layer. In this case, it is preferable that the inner the ply location is, the lower the ply modulus is.

Comparison Test

Test tires having the same structure shown in FIG. 1 except for the carcass structure were made and tested for the rigidity during cornering, ride comfort and shock absorption at the time of landing subsequent to a high jump. These performances were evaluated by test rider's feelings while running a motocross bike on a test course. The results are indicated in Table 1 by an index based on reference tire 1 being 100.

From the test results, it was confirmed that Example tires according to the present invention can be improved in both the rigidity during cornering and ride comfort during straight running.

TABLE 1

| Tire | Ref. 1 | Ref. 2 | Ref. 3 | Ref. 4 | Ex. 1 | Ex. 2 | Ref. 5 | Ref. 6 | Ref. 7 | Ref. 8 | Ex. 3 | Ex. 4 |
|---|---|---|---|---|---|---|---|---|---|---|---|---|
| Tire size*[1] | 80 | 80 | 80 | 80 | 80 | 80 | 110 | 110 | 110 | 110 | 110 | 110 |
| High-modulus layer*[2] | | | | | | | | | | | | |
| cord material*[4] | PE | PE | NY | NY | PE | PE | PE | PE | NY | NY | PE | PE |
| cord angle (deg.) | 31 | 31 | 31 | 31 | 31 | 31 | 31 | 31 | 31 | 31 | 31 | 31 |
| h1/H | 0.23 | 0.23 | 0.23 | 0.23 | 0.23 | 0.23 | 0.23 | 0.23 | 0.23 | 0.23 | 0.23 | 0.23 |
| Low-modulus layer*[3] | | | | | | | | | | | | |
| cord material*[4] | PE | PE | PE | NY | NY | NY | PE | PE | PE | NY | NY | NY |
| cord angle (deg.) | 31 | 31 | 31 | 31 | 31 | 31 | 31 | 31 | 31 | 31 | 31 | 31 |
| h2/H | 0.35 | 0.35 | 0.35 | 0.35 | 0.35 | 0.35 | 0.35 | 0.35 | 0.35 | 0.35 | 0.35 | 0.35 |
| h3/H | 0.52 | 0.52 | 0.52 | 0.52 | 0.52 | 0.52 | 0.52 | 0.52 | 0.52 | 0.52 | 0.52 | 0.52 |
| h4/H | 0.17 | 0.13 | 0.17 | 0.17 | 0.17 | 0.13 | 0.17 | 0.13 | 0.17 | 0.17 | 0.17 | 0.13 |
| Tire weight (kg) | 3.9 | 3.8 | 3.85 | 3.65 | 3.7 | 3.6 | 5.7 | 5.6 | 5.65 | 5.35 | 5.4 | 5.3 |
| Rigidity | 100 | 80 | 95 | 80 | 100 | 100 | 100 | 80 | 95 | 80 | 100 | 100 |
| Shock absorption | 100 | 105 | 105 | 110 | 120 | 110 | 100 | 105 | 105 | 90 | 120 | 110 |
| Ride comfort | 100 | 110 | 105 | 110 | 110 | 120 | 100 | 110 | 105 | 110 | 110 | 120 |

*[1]80: 80/100-21 51M K490
110: 110/90-19 62M D737
*[2]Single ply (not turned up)
*[3]Two plies (turned up)
*[4]PE: 2/1670 dtex polyester cord
NY: 2/940 dtex nylon cord

What is claimed is:
1. A motorcycle tire, comprising:
a carcass composed of a low-modulus layer disposed along the inside of the tire and a high-modulus layer disposed outside thereof,
said high-modulus layer consisting of a single high-modulus ply of organic fiber cords having a initial modulus of not less than 7000 N/sq.mm extending between the sidewall portions through the tread portion and terminated at a position radially outward of the bead cores but radially inward of the maximum width position of the carcass,
said low-modulus layer consisting of two low-modulus plies of organic fiber cords having an initial modulus of less than 6000 N/sq.mm extending between bead portions through a tread portion and sidewall portions and turned up around a bead core disposed in each bead portion, and
the high-modulus ply being higher in ply modulus than the low-modulus ply, wherein the ply modulus is defined as the total of the moduli of the cords plus modulus of topping rubber of the cords per unit width of the ply.

2. The motorcycle tire according to claim 1, wherein the carcass cords are inclined at angles of from 20 to 50 degrees with respect to the tire equator.

3. The motorcycle tire according to claim 1, wherein the ends of the high-modulus ply are disposed axially inside the turned-up portions of the low-modulus plies.

4. The motorcycle tire according to claim 3, wherein the carcass cords are inclined at angles of from 20 to 50 degrees with respect to the tire equator.

5. The motorcycle tire according to claim 1, wherein the radial heights of the turned-up portions of the low-modulus plies are such that the axially outer turned-up portion is higher than the axially inner turned-up portion.

6. The motorcycle tire according to claim 5, wherein the carcass cords are inclined at angles of from 20 to 50 degrees with respect to the tire equator.

* * * * *